UNITED STATES PATENT OFFICE.

JULIO SPELTA, OF BUENOS AYRES, ARGENTINA.

PROCESS OF TREATING SURFACES.

No. 911,171. Specification of Letters Patent. Patented Feb. 2, 1909.

Application filed May 4, 1908. Serial No. 430,801.

*To all whom it may concern:*

Be it known that I, JULIO SPELTA, a subject of the King of Italy, residing at Buenos Ayres, Argentina, have invented new and useful Improvements in Processes of Treating Surfaces, of which the following is a specification.

This invention relates particularly to the process of treating the hulls of ships by means of a mixture of pitch, tar, sand and cement and has for its object to preserve the hull by protecting it against rust and dampness.

Heretofore the hulls of ships and other surfaces exposed to dampness have been treated by a more or less thick and strong paint but so far as I am aware such paints become perforated and detached allowing moisture to enter and remain in free contact with the surface which, whether of metal or of wood will soon corrode and suffer severe damage.

My invention consists in applying to the surface to be treated a thick and completely water tight covering of a mixture formed directly on the surface by applying to the untreated or previously treated surface, a hot mixture of six parts of pitch and one part of tar, whereupon a mixture of two parts of sand and one part of cement is immediately sprayed. This coating is then allowed to dry without further treatment afterwards removing the surplus of sand and cement.

The proportions of the substances above stated and the details of the process may be varied slightly without deviating from the spirit of my invention.

I claim:

1. The process of treating surfaces consisting in applying to the surface a mixture of pitch and tar and applying to said mixture, sand and cement.

2. The process of treating surfaces consisting in applying to the surface a hot mixture of pitch and tar and spraying onto said mixture a mixture of sand and cement.

3. The process of treating surfaces consisting in applying on the surface a hot mixture composed of six parts of pitch and one part of tar and spraying onto said mixture while hot a mixture composed of two parts of sand and one part of cement.

In testimony whereof I affix my signature in the presence of two witnesses.

JULIO SPELTA.

Witnesses:
 PEDRO GARXERLB,
 ANTONIO L. BELLO.